United States Patent Office 3,344,037
Patented Sept. 26, 1967

3,344,037
OXIDATION OF ALCOHOLS AND ALDEHYDES BY INDUCED ENZYMES PRODUCED FROM HYDROCARBON - UTILIZING MICRO - ORGANISMS WHEREBY ALDEHYDES AND ACIDS ARE PRODUCED
Richard I. Leavitt, Pennington, N.J., assignor to Mobil Oil Corporation, a corporation of New York
Filed June 7, 1965, Ser. No. 461,976
9 Claims. (Cl. 195—49)

This invention relates to the enzymic oxidation of carbon compounds to useful derivatives thereof, and particularly to a method for enzymically oxidizing an oxidized hydrocarbon like an alkanol or alkanal to an oxidation product having the same number of carbon atoms, such as, respectively, an alkanal or an alkanoic acid.

The method involves the use of induced enzymes for the oxidation, and it further involves the preparation of such enzymes from suitable microorganisms using a hydrocarbon as the sole source of carbon to supply the growth and energy requirements of the cells. The hydrocarbon is chosen in accordance with the particular carbon compound desired to be oxidized. Considering this last point at greater length, if cells of a desired microorganism are grown and the enzymes are extracted therefrom and mixed with an oxidizable carbon compound, enzymic oxidation of the latter will occur if the enzymes, or one of them, possess specificity for the compound. To insure that the enzymes will have the desired specificity, the cells are grown on a hydrocarbon which is chemically related to the carbon compound in respect of, say, its carbon configuration. For example, if decanol is to be oxidized, the hydrocarbon fed to the cells is desirably an alkane like decane; and in this event the resulting extracted enzymes will be active to oxidize the decanol. The enzymes produced by the cells when they are using the decane are designated induced enzymes, or decane-induced enzymes, and it is found that they tend to show group specificity, by which is meant that they possess oxidative activity not only for decanol but also for closely related alcohol and aldehyde compounds such as nonanol, octanol, undecanol, decanal, octanal, undecanal, etc. In other words, the decane-induced enzymes may be used to enzymically oxidize a number of oxidizable alcohol and aldehyde compounds having, say 8, 9, 10, 11, 12, etc. carbon atoms per molecule.

The method also involves the use of either the total enzyme extract obtained from the cells or a selected component or fraction thereof. This alternative is based on the finding that the total enzyme extract may comprise several enzymes, one of which may be active to oxidize a particular carbon compound while the others are not. For example, the crude extract of decane-induced enzymes may contain decone oxidase, which influences the oxidation of decane; decanol dehydrogenase, which influences the oxidation of decanol; decanal dehydrogenase, which influences the oxidation of decanal; and decarboxylase, which influences the oxidation of decanoic acid. At least some of these enzymes are separable from the overall mixture or extract.

The method further involves the cofactor DPN (diphosphopyridenenucleotide), also termed oxidized cofactor and written as $DPN^+$, the presence of which is required in the described oxidation reactions involving conversion of an alcohol or an aldehyde. This cofactor is produced by the cells, and during the extraction of the same, it follows the enzymes. The following equation may illustrate its role in the oxidation of an alkanal:

$$RCHO + DPN^+ + H_2O \rightarrow RCOOH + DPNH + H^+ \quad (1)$$

This reaction, which is carried out in the presence of the appropriate enzyme, shows the enzymic oxidation of the alkanal to an alkanoic acid and the concomitant reduction of $DPN^+$ to DPNH. A similar reaction occurs when an alkanol is enzymically oxidized to an alkanal, the reaction being as follows:

$$RCH_2OH + DPN^+ \rightarrow RCHO + DPNH + H^+ \quad (2)$$

The DPNH is referred to as the reduced cofactor or reduced nucleotide. It will be noted from Reactions 1 and 2 that in each case shifting of two H atoms is involved, one of them being taken by the $DPN^+$ to form DPNH, and the other being given off as a proton to the medium. The equations thus show that for every molecule of compound undergoing oxidation, one molecule of $DPN^+$ is required, i.e., a stoichiometrical amount of $DPN^+$ is necessary.

As it happens, $DPN^+$ is also obtainable from DPNH by means of the following reaction:

$$DPNH \xrightarrow{\text{DPNH oxidase plus oxygen}} DPN^+ \quad (3)$$

The DPNH oxidase is an enzyme which is present in the crude enzyme extract described above and also in other crude enzyme extracts described hereinafter. Among other advantages, the invention proposes to carry out enzymic oxidations of alcohols and aldehydes in the presence of the required $DPN^+$ and, further, to supply a system for regenerating $DPN^+$ from DPNH so that stoichiometrical amounts of oxidized cofactor will be continuously present for the oxidation of the alcohol or aldehyde.

Essentially, the improved method comprises enzymically oxidizing a carbon compound to an oxidation product thereof having the same number of carbons, and it includes the steps of growing cells of a hydrocarbon-oxidizing microorganism on a nutrient medium using as the sole source of carbon a hydrocarbon preferably having the same number of carbon atoms as said compound, and of harvesting and rupturing the cells and extracting therefrom enzymes whose production was induced by growing the cells on the said hydrocarbon. The enzyme extract as such may be used to oxidize the carbon compound, or as may be preferable, it may be separated so as to isolate an enzyme having specificity for the compound to be oxidized. Assuming that a specific enzyme is isolated, it is mixed with the oxidizable carbon compound, and oxidized cofactor $DPN^+$ is then added, since it is lost during the separation of the enzyme extract. After addition of a source of DPNH oxidase for regenerating $DPN^+$, the resulting mixture is incubated so as to convert the starting compound to a desired oxidation product.

As indicated, the crude enzyme extract may be used in the enzyme oxidation step. But it may be seen that the use of a specific enzyme, as isolated from the enzyme extract, has an advantage in avoiding loss of oxidation product which may occur where a mixture of enzymes is used; that is, if a mixture is used, there exists the possibility that one enzyme of the mixture will have specificity for the oxidation product which results from the activity of another enzyme.

The foregoing method may be discussed in greater detail.

Enzymically oxidizable carbon compounds may be chosen from a broad selection, including aliphatic, aromatic and alicyclic alcohols and aldehydes of varying molecular weight and carbon configurations. A preferred class of compounds comprises alkanols and alkanals having up to 20 or 30 carbons, more preferably those that are liquid at normal temperatures and pressures, and including straight- and branched-chain, saturated and unsaturated compounds.

Another preferred class comprises alkyl-substituted cyclic alcohols and alkanals having 1, 2, or more alkyl substituents each of any suitable length and comprising straight- or branched-chain, saturated or unsaturated radicals, and in which the cyclic moiety is aromatic or cycloparaffinic.

The hydrocarbon fed to the cells as the source of carbon is chosen to substantially correspond to the oxidizable carbon compound in respect of its carbon configuration and, desirably, in respect of the number of carbon atoms. Thus, the choice of hydrocarbon may be as extensive as the foregoing definition of oxidizable carbon compounds, it being only necessary to select the hydrocarbon which corresponds to the alcohol or aldehyde to be oxidized. For example, and as indicated, if the carbon compound to be oxidized is decanol or decanal, the corresponding hydrocarbon is preferably decane.

The oxidized product also corresponds to the starting carbon product in respect of the carbon configuration and number of carbon atoms. As may be apparent, the product is usually a more highly oxidized derivative of the starting compound. In the usual case, the product is an aldehyde when the starting compound is an alcohol, or it is a carboxylic acid when the starting compound is an aldehyde. It is also possible to enzymically oxidize an alcohol to an acid by using the appropriate enzymes.

The microorganism suitable for use in the invention is a hydrocarbon-oxidizer preferably chosen from the genera consisting of Achromobacter, Pseudomonas, Nocardia, Bacillus, and Mycobacterium, and including such species as *A. xerosis, A. gutatus, A. superficialis, A. parvulus, A. cycloclastes, Ps. aeruginosa, Ps. oleovorans, Ps. putida, Ps. fluorescens, Ps. boreopolis, Ps. methanica, N. corallinus, N. opacus, N. paraffinae, N. salmonicolor, B. hexacorbovorum, B. mesentericus, B. toluolicum, M. phlei, M. rubrum, M. luteum, M. lacticola, M. album, M. byalinicum* and *M. leprae*. Preferred organisms comprise those from the genus Achromobacter.

Cells of the microorganism may be grown in an agitated system comprising the hydrocarbon as the sole source of carbon and a conventional aqueous mineral salts medium which includes a source of nitrogen such as nitrate or nitrite or ammonium salt or urea, and such ions as potassium, iron, calcium, magnesium, phosphate, and sulfate, as well as ions of trace elements like zinc, manganese, copper, molybdenum, etc. As water is included in the nutrient mixture, most of these mineral salts will usually be present in sufficient quantity in ordinary potable water supplies. However, it is desirable to add the salts to the mixture to insure their presence in sufficient quantity for growth. Usually the mixture consists primarily of water, which may constitute 99%, or more, by weight of the liquid phase of the mxture, although it may also constitute a lesser portion, going down to 50% of the liquid phase. Generally, any proportion of water heretofore employed in microbial syntheses may be used.

The culture mixture is maintained under conditions to insure optimum growth of the microorganism. The temperature, for example, should be maintained between about 20° and about 55° C., preferably in the neighborhood of 30° C. The pH is maintained near neutrality, namely, about 7.0, although it may range between about 5.5 and 8.5.

After a suitable period of growth, the cells are harvested, washed, and then suspended in an aqueous medium and ruptured to free or make available intracellular enzyme components thereof. Cell rupture may be done by exposing the cells to high frequency oscillations or by other conventional methods including grinding in the presence of abrasives, shaking with abrasives, exposure to lysozyme, compressing and release of pressure as in a French pressure cell, or other physical-chemical treatments designed to rupture the cell and release soluble components therefrom.

The released enzymes and other components dissolve in the surrounding aqueous medium, which usually may be weak aqueous solution of a phosphate salt, giving an aqueous enzyme of a pH of 6 to 8. After removal of cell debris, as by centrifugation of filtration, the resulting crude extract is usable for carrying out enzymic oxidations. However, as described above, it is preferable to separate from it individual enzymes and to employ these in appropriate oxidation reactions. A suitable separation procedure may comprise one or more preliminary purification steps followed by a chromatographical separation of the enzymes using a column of suitable absorbent. For example, and as set forth in detail in Example 1, the crude enzyme extract may be treated to precipitate solids like nucleic acids, then the enzymes may be precipitated from solution by means of a suitable salt, the precipitate desalted, suspended in buffer solution, and absorbed on a column of absorbent, and thereafter the absorbed enzymes may be selectively removed by elution and separately collected.

Suitable adsorbents for the chromatographical separation include diethylaminoethyl cellulose (DEAE), triethylaminoethyl cellulose (TEAE), ECTEOLA cellulose, carboxymethylcellulose (CMC), sulfoethylcellulose, sulfomethylcellulose, and the like. The eluting solvent is a liquid in which the enzyme components are soluble and may be chosen from such compounds as water, ethanol, acetone, methanol, butanol-water mixtures, an aqueous solution (0.01 to 5 molar) of sodium chloride or sodium phosphate or sodium citrate, etc. The solvent may be left in the resulting solution, or it may be removed therefrom.

To digress a moment, it should be observed at this point that the chromatographical separation procedure removes the cofactor $DPN^+$, described above to be necessary for the enzymic oxidation of alcohols and aldehydes. Also removed is DPNH oxidase, the enzyme by means of which $DPN^+$ may be regenerated from its reduced form, DPNH. Both the $DPN^+$ and the DPNH oxidase, as well as DPNH, may be added to a given enzyme. In the case of $DPN^+$, while it is more or less readily available commercially, a desirable source of supply is to obtain it from growing cells by extraction of the same, but the cells should not be grown on the same hydrocarbon, or even a related hydrocarbon, as that used for the preparation of the enzyme extract; rather, in order to avoid the induction of undesired enzymes, the cells should be grown on a substantially different carbon-containing substrate, such as carbohydrate like glucose, maltose, fructose, sucrose, xylose, lactose, galactose, corn steep molasses, beet sugar molasses, starch, or other conventional substrate such as pyruvic acid, glycerol, beta-hydroxybutyric acid, etc. In the case of DPNH oxidase, it is suitably obtained from a crude unpurified cell extract. A preferred procedure comprises obtaining both $DPN^+$ and DPNH oxidase from the same crude non-induced cell extract, the cells having been grown on a non-inducer like glucose as the sole source of carbon, and the resulting cell extract being taken per se for use.

Returning now to the chromatographical separation of the enzymes, isolated enzyme in concentrated form is ready for use to oxidize a suitable carbon compound such as an alcohol or aldehyde. It is added to the compound together with a source of $DPN^+$, desirably too with a source of DPNH oxidase, and the resulting mixture, the pH of which is 5.5 to 8.5, preferably 7, is incubated at about 20 to about 55° C., preferably around 30° C., and for times generally extending up to several hours. During incubation, the mixture is preferably stirred, and of course has access to atmospheric oxygen.

If desired, the progress of the oxidation may be followed by withdrawing and analyzing small samples of the reaction mixture. For this purpose, a small amount of an indicator is incorporated in the mixture prior to incubation, suitably a tetrazolium salt which undergoes reduction as the carbon compound is oxidized. Such salt in oxidized form is colorless, but it becomes colored on reduction. Analysis of the samples is conveniently done by subjecting them to spectrophotometric test such as one involving the selective adsorption of infrared rays, or one involving the absorption of visible light rays of a suitable wave length. As indicated, as the tetrazolium salt is reduced, it acquires a distinctive color and this colored salt in the foregoing tests will adsorb radiation, the amount of which is measured. By comparing the adsorbancy of the mixture with that of a control, the extent of reduction of the tetrazolium salt may be obtained, which in turn corresponds to the extent of oxidation of the carbon compound.

At the conclusion of the oxidation, a small amount of strong mineral acid may be added to stop the reaction. The oxidized products are recovered, suitably by extraction of the incubation mixture with a solvent such as ether, and after evapoartion of the ether from the extract, the desired product may be further separated and purified by conventional procedures such as distillation, solvent extraction, fractional crystallization, and the like.

The invention may be illustrated by the following examples:

EXAMPLE 1

The enzymic oxidation of decanol was carried out, using (1) a crude cell-free enzyme extract prepared from decane-grown cells, and (2) a purified enzyme isolated from a crude enzyme extract and identified as decanol dehydrogenase.

To prepare the enzymes, an Achromobacter Sp., isolated by an enrichment culture technique from soil obtained in Hopewell Township, N.J., was grown using conventional mineral salt nutrient and, as the sole carbon source, n-decane. The mineral salt medium had the following composition, per liter:

| | Grams |
|---|---|
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |
| Urea | 1.5 |

The cells were harvested, suspended in dilute aqueous buffer solution, ruptured, and the suspension then centrifuged at 34,000 times gravity for 30 minutes. The resulting supernatant, comprising crude enzyme extract, was recovered.

The crude enzyme extract was divided into two portions, the first of which was passed through a G-25 Sephadex (a polydextran) column to remove cofactors so that on subsequent testing the effect of added cofactors could be studied. The second portion was used to prepare purified decanol dehydrogenase, as described in the next paragraph.

The last-mentioned second portion of enzyme extract was treated with a 1.0% solution of protamine sulfate, added dropwise in the cold, in a ratio of 1 ml. per 10 ml. of extract. The resulting mixture was centrifuged, and the solids, comprising nucleic acids, were discarded. To the clear supernatant there was added dropwise a saturated solution of ammonium sulfate until the supernatant was 50% saturated with the salt. The resulting mixture was stirred 30 minutes at 0 to 5° C., then centrifuged in the cold, and the resulting precipitate recovered and resuspended in a cold dilute solution containing potassium phosphate buffer. This last mixture, comprising precipitate suspended in the buffer, was passed through a G-25 Sephadex column to remove any ammonium sulfate, and the resulting desalted solution was then passed through a column of DEAE (diethylaminoethyl cellulose), previously charged with 0.01 molar phosphate, pH 6.0, thereby absorbing the enzymes in the column. Fractions were eluted from the column with aqueous sodium chloride solutions ranging in concentration between 0 and 0.3 molar, the solution also being 0.01 molar in phosphate and having a pH of 6. The fractions, each of 5 ml. volume, were collected and examined for the presence of enzymes. Fractions Nos. 62 to 80 were found to contain high levels of decanol dehydrogenase, while Nos. 82 to 106 were concentrated with respect to decanal dehydrogenase. No effort was made to recover decane oxidase or decarboxylase, which apparently remained in the column.

The specific activity of the purified decanol dehydrogenase (No. 2 in following table) for the oxidation of decanol was then determined and compared with that of the crude Sephadex-treated enzyme extract (No. 1 in table), the following results being obtained.

| No. | Enzyme Material | Specific Activity* | | |
|---|---|---|---|---|
| | | No Additions | $DPN^+$ Added | DPNH Added |
| 1 | Crude cell free extract | .00 | 5.0 | 4.5 |
| 2 | Purified decanol dehydrogenase. | .00 | 180.0 | 19.0 |

* Millimicromoles alcohol oxidized/hr./mg. protein.

Each reaction mixture contained the following:

(1) tris-HCl buffer, pH of 8.0, 33 micromoles;
(2) decanol, 0.01 ml.;
(3) $DPN^+$ or DPNH, 0.1 mg.;
(4) cysteine, 10 micromoles;
(5) bacterial extract, 0.2 ml.;
(6) tetrazolium chloride, 10 micromoles;
(7) water to make a total volume of 1.0 ml.

The two mixtures were incubated in an air-nitrogen atmosphere at 25° C. As will be understood, in this test decanol undergoes oxidation by the purified enzyme, decanol dehydrogenase, and as this reaction proceeds, the originally colorless dye, tetrazolium chloride, is reduced, and in such process it undergoes a color change from colorless to red. The amount of dye reduced is equivalent to the amount of decanol oxidized, so that the test provides for the measurement of the color change. At the end of the reaction, therefore, an aliquot of the reaction mixture was taken, dissolved in ethanol, placed in a colorimeter (Bausch and Lomb Spectronic 20), and the adsorbancy of the ethanol solution was determined using light of a wave length of 500 millimicrons. The value of the adsorbancy was correlated to specific activity, the latter being the value reported in the table above.

Looking at the above table, it will be seen that both the crude extract and the purified enzyme were inactive in the absence of added cofactor. In the presence of $DPN^+$, the decanol dehydrogenase was very active, oxidizing the decanol much more rapidly than any of the other mixtures. It will be noted that the purified enzyme in the presence of added DPNH had a specific activity of only 19, which can be explained by the fact that during purification of the enzyme, there was lost substantially all of the enzyme, DPNH oxidase, which is responsible for the regeneration of $DPN^+$ from DPNH. The data show that $DPN^+$ is necessary for the enzymic oxidation of decanol by means of decanol dehydrogenase. In the case of the crude extract (No. 1), low values of specific activity, namely, 5.0 and 4.5, were obtained because this material contains a great deal of extraneous protein; and it will be noted in this connection that specific activity is based on the amount of protein.

In another reaction mixture containing purified decanol dehydrogenase, and also having three times the indicated additions but omitting the tetrazolium salt, a reaction product was isolated which was believed to be decanal. Presence of the latter was verified by conversion to the 2,4-dinitrophenylhydrazone of decanal, which was identified.

EXAMPLE 2

In this example the specific activity of purified decanol dehydrogenase in the oxidation of decanol was compared with that of a mixture of this same enzyme and a crude enzyme extract from glucose-grown cells.

The latter extract was prepared by first growing cells of Pseudomonas aeruginosa on conventional mineral salts using as the sole source of carbon a 0.5% solution of glucose. The aqueous solution was centrifuged at 34,000 times gravity for 30 minutes and the clear supernatant was recovered. It comprised the crude enzyme extract of the glucose-grown cells and contained DPN+ and DPNH oxidase. Specific activities of the following reaction mixtures were determined:

| No. | Enzyme Material | Specific Activity* | | |
| --- | --- | --- | --- | --- |
| | | No Additions | DPN+ Added | DPNH Added |
| 1 | Glucose cell free extract | .00 | .00 | .00 |
| 2 | Purified decanol dehydrogenase. | .00 | 180 | 19 |
| 3 | Mixture of Nos. 1 and 2 | .00 | 210 | 210 |

*Millimicromoles alcohol oxidized/hr./mg. protein.

Other conditions were the same as in Example 1. It will be seen that reaction mixture No. 3 gave the highest specific activity values whether DPN+ or DPNH was added. This last result is attributed to the use of the crude glucose cell-free extract which contained the enzyme DPNH oxidase, as well as oxidized cofactor DPN+. Thus, considering the case of added DPN+, note table, as the DPN+ was reduced to DPNH, the latter in the presence of DPNH oxidase and oxygen was oxidized to DPN+, so that the oxidized cofactor was continuously present in the reaction mixture and so that a considerable amount of decanol was oxidized. Considering now the case of the added DPNH, in the presence of the DPNH oxidase and oxygen this cofactor was oxidized to DPN+, so that again the latter cofactor was continuously present in the reaction mixture.

EXAMPLE 3

A crude enzyme extract from decane-grown cells was used to oxidize decanal to produce decanoic acid. The Achromobacter species used in Example 1 was grown in an agitated system on a conventional mineral salts medium with n-decane as the sole source of carbon. After about 48 hours, the cells were harvested by centrifugation, washed with a 0.02 molar aqueous solution of phosphate of pH 7.0, and then suspended in a 0.05 molar aqueous solution of phosphate of pH 7.0 to provide a concentration of about 1 g. of cells per 4 ml. of suspension. The suspension was then exposed to the high frequency oscillations of an ultrasonic device identified as a Branson Sonofier to rupture the cells and to free soluble cell components, including enzymes and cofactors, which dissolved in the phosphate solution. Cell debris was removed by centrifugation of the solution. The crude extract, which contained DPN+ and DPNH oxidase, was then tested for its ability to oxidize n-decanal. For this purpose, it was mixed with 100 micromoles of decanal and 1 micromole of the indicator, 2,3,5-triphenyltetrazolium chloride, and the resulting mixture incubated for 10 minutes at 25° C. with shaking. The mixture was allowed access to air. The oxidation of the decanal was stopped by the addition of 0.1 ml. of 3 N sulfuric acid, and the mixture was then tested for adsorption of visible light rays of a wave length of 500 millimicrons (0.5 micron) in a Bausch and Lomb colorimeter. The crude extract had an adsorbancy of 0.78 optical density unit, after being corrected for endogenous reduction of the tetrazolium salt. The value of 0.78 unit represents a substantial reduction in the transmission of light by the sample, owing to the presence of the colored form of the tetrazolium salt, and is substantially equivalent to an amount of 0.25 micromole (250 millimicromoles) of decanal undergoing oxidation.

A second crude extract from decane-grown cells was prepared as just described and used to oxidize decanal in the foregoing manner except that no indicator was used. After the oxidation, the extract mixture had an absorbancy of 0.78 optical density unit. The presence therein of decanoic acid was then demonstrated by gas co-chromatography with a known sample of decanoic acid. In addition, the crude extract after oxidation of the decanal had the odor of the known decanoic acid sample.

Reference may be made at this point to the accompanying flow sheet in which the full lines are intended to show preferred procedures and the broken lines other procedures of value. For convenience of consideration, the flow is illustrated in connection with specific compounds, but it is to be understood that it has general application.

The work described in Example 1, involving decanol dehydrogenase, is apparent in the flow sheet. Thus, cells are grown on decane in the incubation step 10, the crude enzyme extract 11 is separated from the cells and then further separated at 12 into the enzymes decanol dehydrogenase and decanal dehydrogenase. The former is flowed through line 13 where it is mixed with a source of DPN+, as at 14, incubated with decanol at 15, and decanal is identified, separated at 16, and recovered at 17. As indicated, in step 15 the DPN+ is reduced to DPNH. Example 1 shows that a considerable amount of decanol is oxidized.

Similarly, the work of Example 2, run No. 3, may be followed, comprising mixing decanol dehydrogenase at 18 with the DPN+-containing DPNH oxidase-containing crude extract from glucose-grown cells, indicated at 19, incubating the resulting mixture with decanol at 15, with resultant formation and recovery of decanal at 17. As before, during the progress of the incubation step at 15, DPN+ is reduced to DPNH, but in this case, the crude enzyme extract at 19 also contains DPNH oxidase, so that in the presence of the latter, and oxygen, the DPNH is oxidized back to DPN+, as shown. Thus, a continuous supply of DPN+ is available for the continuous oxidation of the decanol, and as demonstrated in Example 2 a substantial amount of decanol undergoes oxidation.

The work described in Example 3 is also apparent in the flow sheet, comprising growing cells on decane in incubating step 10, recovering crude enzyme extract 11, passing the latter through line 20 to incubating step 21, adding decanal thereto from 17, and oxidizing the latter to decanoic acid, which may be recovered. As will be understood, the crude enzyme extract contains the DPN+ necessary for this oxidation step and also DPNH oxidase, for regeneration of DPN+. As indicated in Example 3, a considerable amount of decanal is oxidized.

In addition to the foregoing flows, other procedures are of interest. Thus, both decanal and decanoic acid may be produced by isolating at 12 both decanol and decanal dehydrogenases from the crude enzyme extract 11, incubating at 15 decanol dehydrogenase with decanol and a source of DPN+ (either from 14 or 19) to produce decanal, recovering a portion of the latter as product, passing another portion to incubating step 21, passing decanal dehydrogenase together with a source of DPN+ through lines 22 and 23 to said step, enzymically oxidizing the decanal to decanoic acid, and recovering the latter. Preferably, the crude enzyme extract at 19 is used as the source of the required DPN+ as it contains DPNH oxidase for regenerating DPN+ from reduced cofactor.

It will be understood that the decanol may come from within or without the process. This applies to all the flows.

Another procedure comprises forming decanal from decanol, and producing decanol from decane. Either the aldehyde or the alcohol, or both, may be removed as product. Thus, the crude enzyme extract at 11 may be passed without separation through line 24 and mixing zone 18 to the incubating step 15 where it is mixed with decanol to carry out the oxidation of the latter to decanal. The crude extract contains both DPNH oxidase and $DPN^+$, so that no additions of the latter are necessary. The effluent from incubating step 15, after separation of the decanal in 16, comprises a DPNH-containing remainder which is sent by line 25 to incubating step 26 for the oxidation of decane, the latter being supplied through line 27. For the enzymic oxidation of decane, the required enzyme is decane oxidase, and the required cofactor is the reduced nucleotide, DPNH. The decane oxidase necessary for oxidizing the decane is obtained in the separation step at 12. It will be recalled in this connection that in the separation of the crude enzyme extract as described above in Example 1, the enzyme, decane oxidase, was one of those which remained in the column of adsorbent; this enzyme may be desorbed from the column by means of a suitable solvent and passed by line 28 to join the decane in line 27 flowing to the incubation step 26. The material in line 25 contains DPNH oxidase, as well as DPNH, so that in step 26 DPNH is oxidized to $DPN^+$ in the presence of the DPNH oxidase. Decanol formed in step 26, together with accompanying $DPN^+$, may be passed entirely through line 29 to the incubation step 15 for conversion to decanal; or it may be passed to 30 and separated into decanol and $DPN^+$, and a part or all of the decanol recovered, or a part or all, together with $DPN^+$, passed by means of lines 31, 32, and 29 to incubation step 15.

Another procedure comprises making decanoic acid from decanal, and decanol from decane. Decanoic acid may be formed in step 21 from decanal, the latter being added from 17 as shown, and the necessary enzyme, decanal dehydrogenase, being added through lines 22 and 23. $DPN^+$ cofactor is obtained through line 33, preferably coming from the crude enzyme extract at 19 by means not shown. Decanol may be formed from decane in step 26, to which a DPNH-containing material is added as well as decane from line 27 and the required enzyme from line 28. The DPNH-containing material may be one obtained in the separation step 16 and which flows in line 25; or preferably it is one which is produced in step 21, where $DPN^+$ is reduced to DPNH, and which is available for use after decanoic acid is removed from the incubation mixture; this latter DPNH-containing material may be sent to step 26 by means not shown.

An additional procedure comprises making decanal, decanoic acid, and decanol. The decanal is formed in step 15 from decanol, using decanol dehydrogenase and the $DPN^+$-containing crude extract at 19. A portion of the decanal produced is recovered, and a portion is passed to step 21, together with decanal dehydrogenase and a source of $DPN^+$ from lines 22 and 23, where decanal is oxidized to decanoic acid and the latter recovered. Decanol may be produced in step 26 where decane from line 27 is oxidized in the presence of the DPNH-containing material introduced by line 25 and the appropriate enzyme introduced by lines 28 and 27. A part of the decanol may be recovered, after separation in 30, and a part may be sent to step 15 through lines 31, 32, and 29.

It will be understood that the invention is capable of obvious variations without departing from its scope.

In the light of the foregoing description, the following is claimed:

1. Method of enzymically oxidizing a carbon compound selected from the class consisting of alcohols and aldehydes to an oxidized product having the same number of carbons, said oxidizing reaction requiring the presence of oxidized cofactor $DPN^+$, which comprises growing cells of a hydrocarbon-oxidizing microorganism on a nutrient medium using as the sole source of carbon a hydrocarbon having substantially the same number of carbons as said carbon compound, harvesting the cells and rupturing the same, extracting from the ruptured cells enzymes whose production by the cells was induced by growing the latter on said hydrocarbon, isolating from said enzyme extract an enzyme having specificity for said carbon compound and mixing the same with said carbon compound, adding to the resulting mixture a crude $DPN^+$-containing, DPNH oxidase-containing enzyme extract obtained from non-induced cells grown on a non-hydrocarbon carbon-containing substrate as the sole source of carbon, incubating said mixture to enzymically oxidize the carbon compound to said product and coincidently therewith to reduce said $DPN^+$ cofactor to reduced cofactor DPNH, and said DPNH oxidase acting to regenerate $DPN^+$ from DPNH and thereby to help maintain stoichiometrical amounts of $DPN^+$ in said mixture.

2. Method of claim 1 wherein said carbon compound is an alcohol and said isolated enzyme is an alcohol dehydrogenase.

3. Method of claim 1 wherein said carbon compound is an aldehyde and said isolated enzyme is an aldehyde dehydrogenase.

4. Method of claim 1 wherein said carbon compound is an alkanol, said oxidized product is an alkanal, said hydrocarbon is an alkane, and said isolated enzyme is an alkanol dehydrogenase.

5. Method of claim 1 wherein said carbon compound is an alkanal, said oxidized product is an alkanoic acid, said hydrocarbon is an alkane, and said isolated enzyme is an alkanal dehydrogenase.

6. Method of preparing products including an aldehyde and a carboxylic acid by means of enzyme oxidation reactions which comprises growing cells of a hydrocarbon-oxidizing microorganism on a nutrient medium using as the sole source of carbon a hydrocarbon having substantially the carbon configuration as said products, harvesting the cells and rupturing the same, extracting from the ruptured cells enzymes whose production by the cells was induced by growing the latter on said hydrocarbon, isolating from said extract an alcohol dehydrogenase and an aldehyde dehydrogenase, adding to the former an alcohol and a crude $DPN^+$-containing, DPNH oxidase containing enzyme extract obtained from non-induced cells grown on a non-hydrocarbon carbon-containing substrate as the sole source of carbon, incubating the resulting mixture to enzymically oxidize the alcohol to said product aldehyde and coincidently therewith to reduce said $DPN^+$ to reduced cofactor DPNH, recovering a portion of said product aldehyde, mixing another portion thereof with said aldehyde dehydrogenase and with an amount of said crude non-induced enzyme extract, incubating the resulting mixture to enzymically oxidize the aldehyde to said product acid, and recovering the latter.

7. Method of preparing an aldehyde and an alcohol by enzymic oxidation of precursor compounds which comprises growing cells of a hydrocarbon-oxidizing microorganism on a nutrient medium using as the sole source of carbon a hydrocarbon having substantially the carbon configuration as said aldehyde and alcohol, harvesting and rupturing the cells and extracting therefrom enzymes whose production was induced by growing the cells on said hydrocarbon, isolating from said enzyme extract an enzyme having specificity for a precursor alcohol and incubating the same with said precursor alcohol and with a crude enzyme extract obtained from non-induced cells, said crude extract containing oxidized cofactor $DPN^+$ and DPNH oxidase, thereby enzymically oxidizing said precursor alcohol to said product aldehyde and coincidently therewith reducing said $DPN^+$ to reduced cofactor DPNH, recovering said product aldehyde, isolating from said hydrocarbon-induced enzyme extract a fraction comprising an enzyme having specificity for said hydrocarbon, mixing said fraction with said DPNH and with said hydrocarbon and incubating the resulting mixture to enzymically oxidize said hydrocarbon to said product alcohol, said last-mentioned alcohol being the same as said precursor alcohol, recovering a portion of said product alcohol and recirculating a portion to said precursor alcohol incubating step.

8. Method of preparing products including an alcohol and carboxylic acid by means of enzymic oxidation reactions which comprises growing cells of a hydrocarbon-oxidizing microorganism on a nutrient medium using as the sole source of carbon a hydrocarbon having substantially the carbon configuration as said products, harvesting and rupturing the cells and extracting therefrom enzymes whose production was induced by growing the cells on said hydrocarbon, separating said extract to isolate therefrom an aldehyde dehydrogenase and a fraction comprising a hydrocarbon oxidase, mixing the aldehyde dehydrogenase with an aldehyde and with a crude $DPN^+$-containing, DPNH oxidase-containing, enzyme extract obtained from non-induced cells grown on a non-hydrocarbon carbon-containing substrate as the sole source of carbon, incubating the resulting mixture to enzymically oxidize the aldehyde to said product acid and coincidently therewith to reduce said $DPN^+$ oxidized cofactor to reduced cofactor DPNH, said resulting DPNH being then oxidized by the influence of said DPNH oxidase to $DPN^+$ to thereby provide a continuous supply of $DPN^+$ in said incubating step, recovering said product acid, passing said fraction of hydrocarbon-induced enzyme extract together with a source of DPNH and an amount of said hydrocarbon to a hydrocarbon incubating step to enzymically oxidize said hydrocarbon to an alcohol, and recovering the latter.

9. Method of preparing products including an alcohol, aldehyde, and carboxylic acid by means of enzymic oxidation reactions which comprises growing cells of a hydrocarbon-oxidizing microorganism on a nutrient medium using as the sole source of carbon a hydrocarbon having substantially the carbon configuration as said products, harvesting and rupturing the cells and extracting therefrom enzymes whose production was induced by growing the cells on said hydrocarbon, separating said extract to isolate therefrom an alcohol dehydrogenase, an aldehyde dehydrogenase, and a fraction comprising a hydrocarbon oxidase, mixing the alcohol dehydrogenase with an alcohol and with a crude $DPN^+$-containing, DPNH oxidase-containing, enzyme extract obtained from non-induced cells grown on a non-hydrocarbon carbon-containing substrate as the sole source of carbon, incubating the resulting mixture to enzymically oxidize the alcohol to said product aldehyde and coincidently therewith to reduce said $DPN^+$ to reduced cofactor DPNH, recovering a portion of said product aldehyde and sending another portion to an aldehyde incubating step, recovering a DPNH-containing remainder from said alcohol incubating step, passing said aldehyde dehydrogenase together with an additional amount of said crude non-induced enzyme extract to said aldehyde incubating step to enzymically oxidize said aldehyde to a product carboxylic acid, passing said fraction of hydrocarbon-induced enzyme extract together with said DPNH-containing remainder and an amount of said hydrocarbon to a hydrocarbon incubating step to enzymically oxidize said hydrocarbon to an alcohol, recovering a portion of the latter and recirculating another portion to the alcohol incubating step.

No references cited.

A. LOUIS MONACELL, *Primary Examiner.*

L. M. SHAPIRO, *Assistant Examiner.*